US006260066B1

(12) United States Patent
Bittinger et al.

(10) Patent No.: US 6,260,066 B1
(45) Date of Patent: *Jul. 10, 2001

(54) METHOD AND APPARATUS FOR OPTIMAL REBASING OF WEB PAGE TRANSMISSION USING A PLURALITY OF DIFFERENT REBASING TESTS AND A COST-EFFECTIVENESS DETERMINATION

(75) Inventors: Reed Richard Bittinger, Raleigh; Barron Cornelius Housel, III, Chapel Hill; David Bruce Lindquist, Raleigh; Jonathan Paul Munson, Chapel Hill, all of NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/421,079

(22) Filed: Oct. 19, 1999

Related U.S. Application Data

(62) Division of application No. 08/819,222, filed on Mar. 17, 1997, now Pat. No. 6,073,173.

(51) Int. Cl.[7] .......................... G06F 15/173; G06F 15/16
(52) U.S. Cl. ........................................... 709/224; 709/234
(58) Field of Search ..................................... 709/224, 203, 709/206, 205, 204, 231, 232, 233, 234; 707/203

(56) References Cited

U.S. PATENT DOCUMENTS

| 5,754,774 | * | 5/1998 | Bittinger et al. | 395/200.33 |
| 5,768,515 | * | 6/1998 | Choquier et al. | 395/200.36 |
| 5,873,097 | * | 2/1999 | Harris et al. | 707/203 |
| 6,073,173 | * | 6/2000 | Bittinger et al. | 709/224 |

OTHER PUBLICATIONS

Bolot et al, Performance Engineering of the World Wide Web: Application to Dimensioning and Cache Design, http://www5conf.inria.fr/fich_ht,;/paper/p44/Overview.html#/Abrams95, pp 1–11, May 1996.*

* cited by examiner

*Primary Examiner*—Moustafa M. Meky
*Assistant Examiner*—Tod Kupstas
(74) *Attorney, Agent, or Firm*—Jeanine S. Ray-Yarletts; Marcia L. Doubet

(57) ABSTRACT

A method of updating or rebasing templates for information sent across a relatively slow transmission link such that only changed information is transmitted across the links. In addition, the information is updated such that the information transmitted across the links is minimized by updating the templates based on the characteristics of the data being sent.

21 Claims, 5 Drawing Sheets

METHOD AND APPARATUS FOR OPTIMAL REBASING OF WEB PAGE TRANSMISSION USING A PLURALITY OF DIFFERENT REBASING TESTS AND A COST-EFFECTIVENESS DETERMINATION

This applic. is a Div. of Ser. No. 08/819,222 filed Mar. 17, 1997, now U.S. Pat. No. 6,073,173.

FIELD OF THE INVENTION

The present invention relates to a method of updating or rebasing templates for information transmitted over low speed or wireless links such that the incremental information necessarily transmitted over the links is minimized.

BACKGROUND

The paradigm for the Internet is that of a client-server relationship where the Internet clients (browsers) communicate with Internet servers. To provide greater access to the Internet, communication protocols and languages utilized by the clients and servers have become standardized. These protocols include Hyper-Text Transfer Protocol (HTTP), which is the communications protocol used for communications between clients and servers, and the Transmission Control Protocol/internet Protocol (TCP/IP). Also standardized is the language by which clients and servers communicate, called Hyper-Text Markup Language (HTML).

Given the growth in popularity of the World Wide Web, the client-server paradigm has become pervasive. The browser or client acts as the user interface and sends requests to the server which satisfies those requests. The server processes the browser requests and returns the requested response as an HTML data segment of an HTTP data stream. The popularity of the World Wide Web has lead to a large install base for browsers and servers in the computer marketplace. The standardization of the languages and protocol of the Internet, in addition to the significant installed base, has facilitated the creation of a significant number of forms-based applications which reside on the World Wide Web. A forms-based application is one which presents templates or forms where only minor modifications are made and data fields are filled in. This allows for effective transmission of information to the users without requiring a customized page in response to each request for information.

As the World Wide Web has increased in popularity, so has the concept of mobile computing. The price of notebook or portable computers has significantly decreased, the power and performance has significantly increased and the size has decreased such that mobile computing is quickly becoming the method of choice for many professionals. The use of laptop computers, notebook computers, Personal Digital Assistants (PDAs) and other portable devices has led to an increase in demands for wireless communications. Wireless wide area networks, cellular communications and packet radio, however, suffer from significant limitations if used in a web context. The high cost per byte of communications, slow response time, low bandwidth and unreliability all hamper the use of wireless technology for the communications protocol of the Internet. In addition to the disadvantages of using wireless communications in the Internet environment, traditional caching techniques are also only of limited use. Refreshing cached data received from a web server presents reliability and availability difficulties when used in the Internet environment. For example, if cached data is refreshed each time a new instance of a web browser is initiated then a number of unnecessary browser requests may be generated if the information is not utilized during the particular instance of the web browser. If cached data is not refreshed then the data in the cache may not be reliable.

The initial problem of the inefficiencies of present caching algorithms was addressed in the invention presented in application Ser. No. 08/601,753 entitled Time Coherent Caching System filed on Feb. 15, 1996 now U.S. Pat. No. 5,878,213 and assigned to the assignee of the present invention. In the Time Coherent Caching System application, a method for caching data received from a first application and to be provided to a second application, in response to a request from the second application, was provided. The method included storing a data stream to be received from the first application and to be provided to the second application in a cache to create a client cache entry corresponding to the request from the second application. Requests from the second application are interrogated to determine if a client cache entry exists corresponding to the request. If a client cache entry exists which corresponds to the request then the client cache entry time record for the client cache entry corresponding to the request from the second application is evaluated to determine if the client cache entry corresponding to the request from the second application was created within a predetermined client coherency time interval prior to the second application requesting the information. The client cache entry is supplied to the second application in response to the request if the client cache entry was created within a predetermined client coherency time interval prior to the second application requesting the information. In further enhancements to the referenced application, client cache entries are maintained across multiple instances of the second application. Several variations were provided in the referenced application to this theme.

In addition to the above mentioned application, application Ser. No. 08/601,903 now U.S. Pat. No. 5,859,971 entitled Differencing Communication System was filed by the assignee of the present invention to reduce the impact of the wireless bandwidth being significantly lower than that of terrestrial links. In the Differencing Communication System application, a method of reducing the data transmitted over a communication link from a first application resident in a first computer to a second application resident in a second computer, where the data is transmitted over an external communication link from the first computer to the second computer, was introduced. One aspect of that invention included storing a data stream from the first application to be provided to the second application in response to a request from the second application in a cache resident in the first computer to create a server base cache entry. The data stream to be provided to the second application in response to a request from the second application is also stored in a cache resident in the second computer to create a client base cache entry. Requests from the second application are evaluated to determine if a client base cache entry corresponding to the interrogated request exists to provide a client base form. Requests from the second application are also interrogated to determine if a server base cache entry corresponding to the interrogated request exists to provide a server base form. The data stream corresponding to the response originated by the first application in response to the interrogated request from the second application is intercepted prior to transmission of the response on the external communication link and compared to the server base form to provide difference data corresponding to the difference between the intercepted response and the server base form. The difference data is sent to the second computer over the external communications link and the difference data transmitted over the external communications link sent by the first computer is acquired from the external communication link. The response data stream corresponding to the communication from the first application is reconstructed from the client/server specific data stream received over the external communication link by combining the client base form with the difference data received over the external communication link to create a response data stream corresponding to the intercepted response. The reconstructed data stream corresponding to the intercepted response is provided to the second application. For further information or variations of this invention, see Application Ser. No. 08/601,903.

RELATED APPLICATIONS

Patent application Ser. No. 08/601,753 (now U.S. Pat. No. 5,878,213) entitled Time Coherent Caching System filed on Feb. 15, 1996 and assigned to International Business Machines Corporation.

Patent application Ser. No. 08/601,755 (now U.S. Pat. No. 5,867,661) entitled Reduced Overhead TCP Communication System filed on Feb. 15, 1996 and assigned to International Business Machines Corporation.

Patent application Ser. No. 08/601,903 (now U.S. Pat. No. 5,859,971) entitled Differencing Communication System filed on Feb. 15, 1996 and assigned to International Business Machines Corporation.

SUMMARY OF THE INVENTION

The present invention builds on the philosophy implemented in WebExpress of data-reduction. The paradigm is for the application to send document difference rather than the entire document across the wireless or slow transmission link. The success of this technique depends on the size of the difference between the base document (the document being differenced against) and the response documents. For this to be efficient, the difference should be small relative to the sizes of the responses. HTTP responses of the kind that the present invention is designed to work well for often are composed of two components: data that is specific to the particular request, and data that is the same for all requests, such as titles, headings, and HTML markup tags. This latter we term the response "template." When a template changes it is generally desirable to substitute for the old base a new base that includes the new template. The prior art solutions are unable to determine when the variation is a result of template change and when it is due to naturally occurring factors such as different request parameters resulting in differently sized responses. This is due to the fact that the variability is so difficult to predict.

The present invention works on the ability to anticipate a variety of template change scenarios. For each of the probable template change scenarios, a test over a predefined range of responses is devised. This test is designed to indicate when a particular distribution of data being sent corresponds to an anticipated template change scenario.

DETAILED DESCRIPTION OF THE PREFERRED EMBODIMENT

The preferred embodiment of the present invention is that which is implemented in IBM's WebExpress, although the present invention is applicable to any forms based environment.

HTTP responses of the kind that WebExpress is designed to work well for often are composed of two components: data that is specific to the particular request, and data that is the same for all requests, such titles, headings, and HTML markup tags. This latter is termed the response "template." When a template changes it is generally desirable to substitute for the old base a new base that includes the new template. The prior art solutions are unable to detect when the variation is a result of template change and when it is due to naturally occurring factors such as different request parameters resulting in differently sized responses. The present invention describes a method and apparatus of detecting when a template has changed, thereby indicating that the template should be updated.

The method and apparatus of the present invention to solve the above mentioned problem is to anticipate a variety of template change scenarios, and then for each scenario devise a test over the distribution of responses that will detect the particular distribution that corresponds to the anticipated template change scenario. For example, one test detects a large and sudden increase in the difference sizes due to a large change in the template. If any test indicates that a rebasing may be called for, further analysis is performed to determine if the benefits of rebasing are likely to outweigh the costs. Thus the algorithm embodied in the present invention is divided into two stages:

stage one is the rebasing indicator testing; and, stage two is the cost recovery.

Although there are only a couple of tests for rebasing illustrated in the preferred embodiment, any test can be used or added to the present system without altering the present invention.

Figure 1:
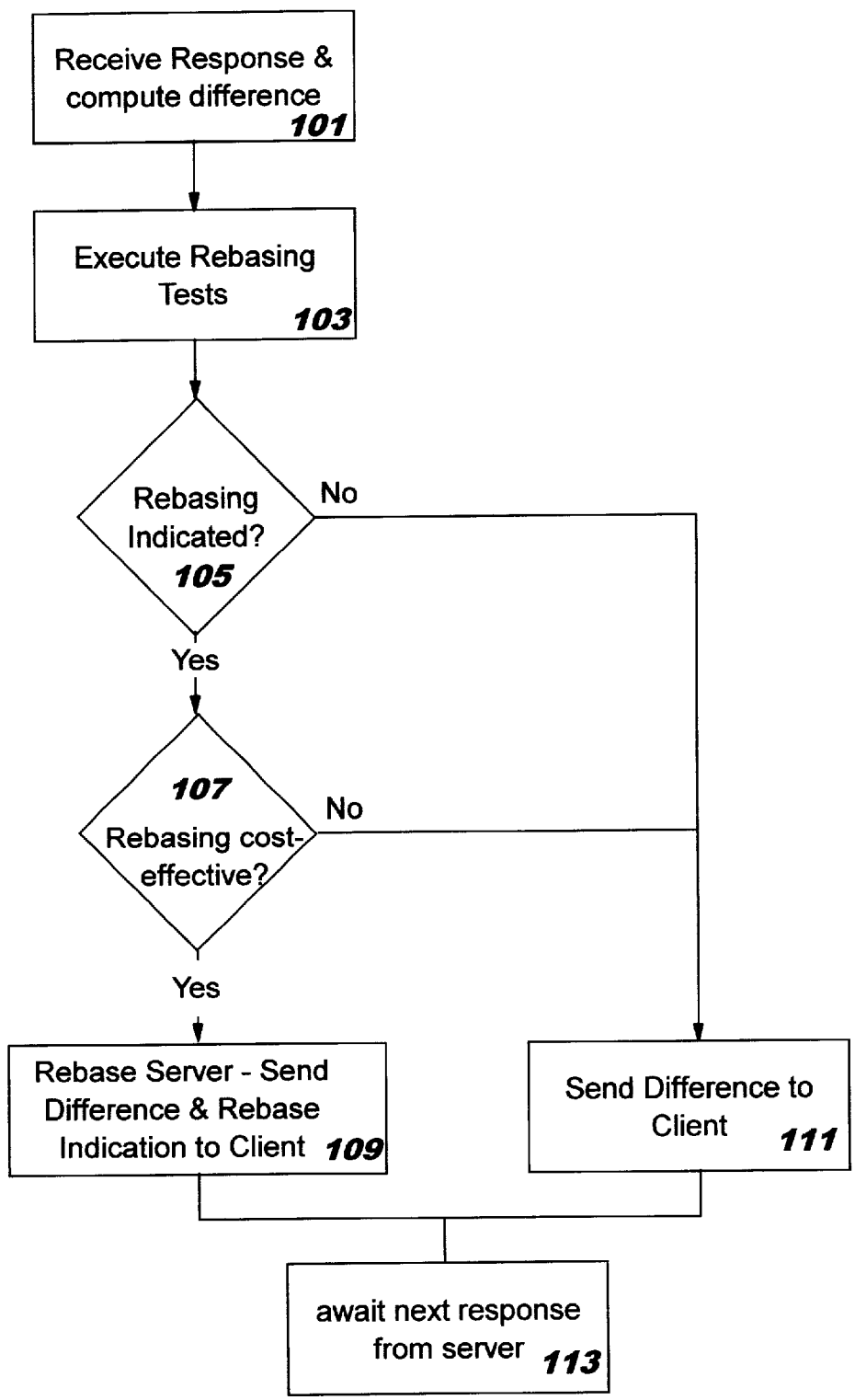
FIG. 1 is a flow chart depicting an overview of the present invention.
Figure 5:
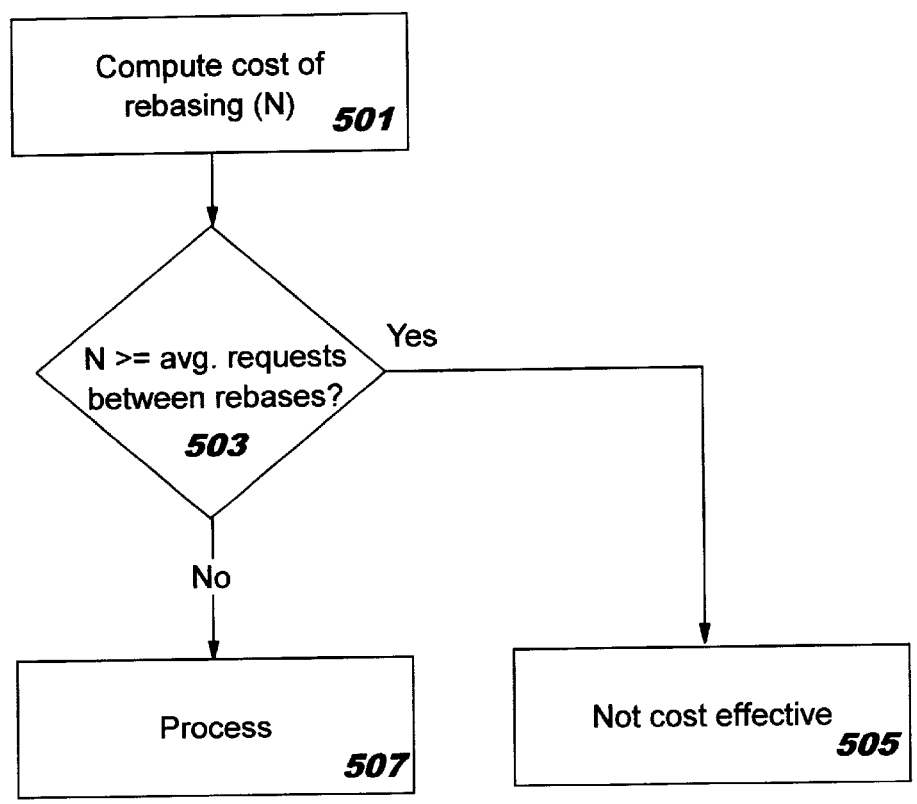
FIG. 5 depicts the logic in the cost-effectiveness decision.

FIG. 1 shows the outermost logic of the rebasing algorithm. As in the prior related applications, the system assumes that a template or base form is held in cache at the server computer. The first step is computing the difference between the response received from the application and the cached base response (101). A set of rebasing tests (103) is then run against the difference (the rebasing tests are further defined in FIG. 2). If no rebasing test indicates the need for rebasing (105), processing continues as before where the difference between the response to the client and the response base stored in the server's cache is determined and the response difference is sent to the client (111); then the system continues until another response from the server is received (113). If any test from block 103 does indicate the need for rebasing, a test is then made to determine the cost-effectiveness of rebasing (107). Further options for the cost-effectiveness test are depicted in FIG. 5. If rebasing is determined to be cost-effective, the document associated with the URL is rebased by storing the current response as the new response base (109) then the difference between the new response base and the old response base is sent to the client with an indication that the prior template, incorporating the current changes, is now to be used as the new base. The system then continues until another response from the server is received (113). If the rebasing was determined not to be cost-effective (107), then processing would continue as before and the difference between the indicated response to the client and the response base would be calculated and the response difference sent to the client (111) and the system continues until another response is received (113).

The rebasing indicator tests of the preferred embodiment are based on the assumption that, in the absence of changes in the template, the sizes of the differences (the lengths in bytes of the difference representations) between the responses and the base are randomly distributed, with mean and variance differing for different URLs. Specifically, an assumption is made that the size of the difference for one response has no predictive value for the size of the difference for the next response. Furthermore, an assumption is made that, when the template does change, there will be an increase in the mean of the sizes of the base/response differences following the template change. The problem addressed by the first stage of the algorithm is to detect such an increase in the mean as quickly as possible while accommodating the desire to avoid unnecessary rebasing. Because the amount of increase caused by a change in template varies, as well as the frequency of template change, no one test can accurately detect a change in template. Two tests have been devised for the preferred embodiment of the present invention which are described below. Although only two tests are demonstrated, the algorithm is designed to accommodate any number of tests should experience indicate the need for additional ones.

Figure 2:
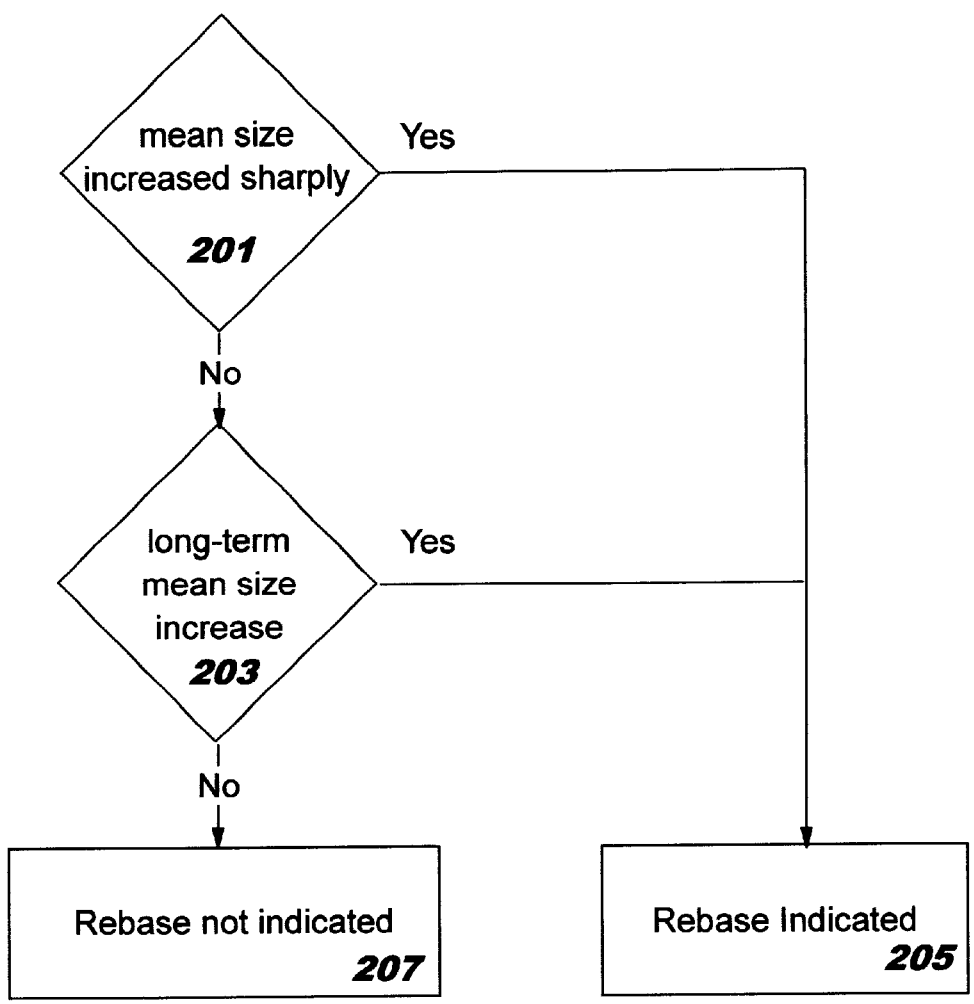
FIG. 2 depicts two possible rebasing tests.

FIG. 2 shows the outer rebasing testing logic. Two tests are performed in the preferred embodiment. First, a test is made to determine if the mean difference size of subsequent differences increased sharply or abruptly (201) which may indicate a major change in the template document. If this happened, it is assumed that the template has changed and a rebase is indicated (205). If the mean difference size did not increase sharply or abruptly (201), a test is then made to determine if the mean difference size is slowly increasing over the long-term (203) which may indicate small changes to the template. If it is determined that the size of the difference is slowly and steadily increasing, a template change is again assumed and a rebase is indicated (205). In the preferred embodiment of the present invention, if neither of the two above conditions are indicated, then the template is assumed not to have changed and the document is not rebased (207).

Figure 3:
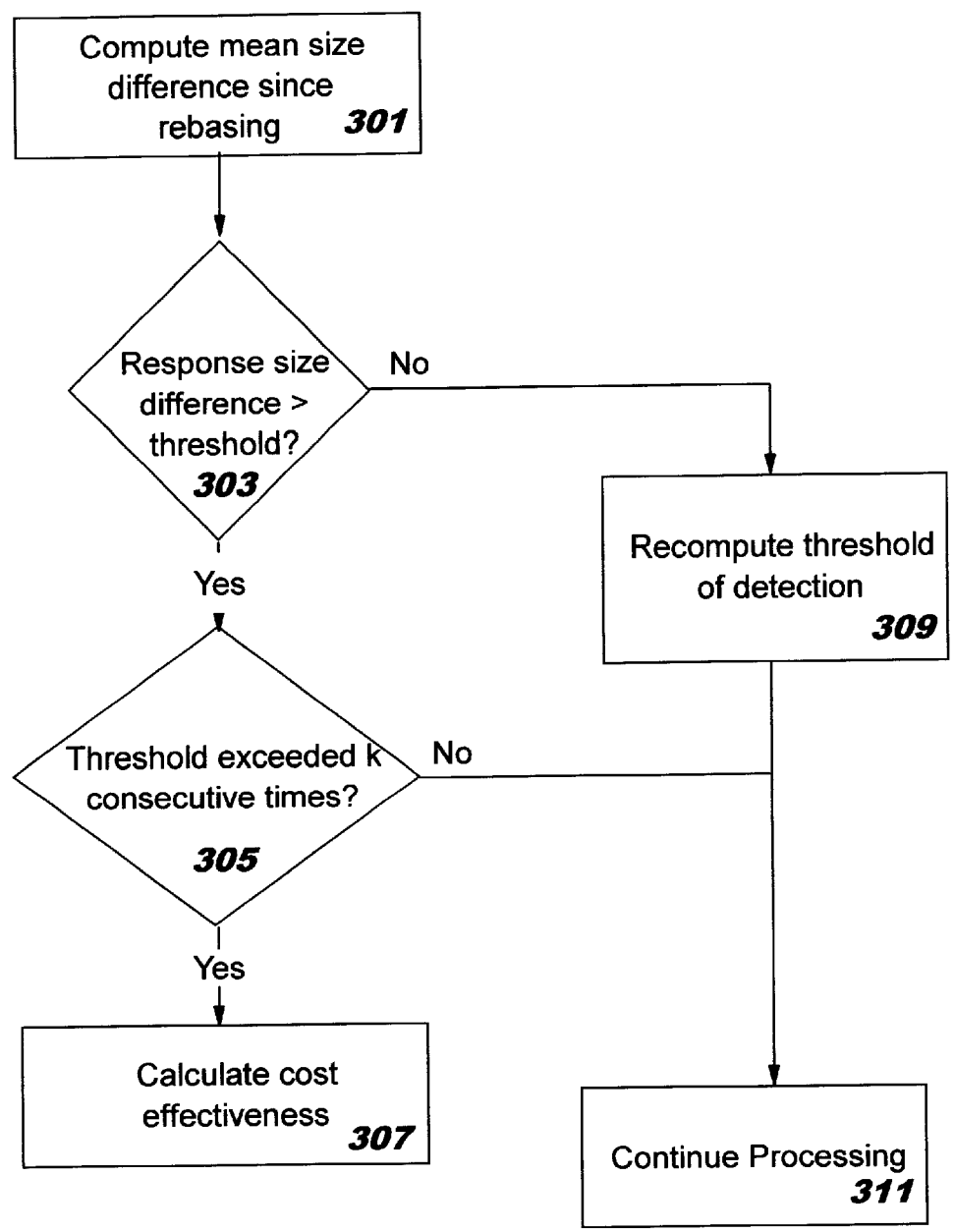
FIG. 3 depicts a step test computation.

FIG. 3 is a more detailed depiction of the logic for a step-increase-in-difference-size test (step test) of the preferred embodiment which detects a sharp increase. The step test was designed by modeling the series of difference sizes as a binary distribution of "difference size greater than median difference size" (positive difference) and "difference size less than or equal to median difference size" (negative difference). Since the difference sizes are randomly distributed about the distribution median, this binary distribution should also be randomly distributed. For ease of computation in the preferred embodiment, the mean is used as an approximation of the median. Furthermore, in the few (some numbers) responses immediately following a rebasing, when the mean is especially unstable and not a reliable approximation of the median, a fixed, small number m0is used as the approximation to the median. The constants s and m0 are set to 6 and 0, respectively in the present implementation of the preferred embodiment. Given the above described model, a significant change in the URL template will result in a disproportionate number of positive differences. In order to have a certain confidence C (%) that a succession of positive differences is not a result of random variation in the responses, a number k, is calculated where k is the smallest integer greater than zero such that $1/(2^{**}k)$ is less than or equal to 100%−C. The test consists of counting successive positive differences, and returning an indicator when the number of counted successive positive differences reaches the predetermined value k.

In FIG. 3, first the mean of difference sizes is computed for all responses since the last rebase (301). This is done by updating the past mean to include the current difference size. Next a test is made to determine if the size of the response difference exceeds a threshold of detection (303) which is a tolerance where the difference is determined to be significant. If the threshold of detection is exceeded, a test is made to determine if the threshold was exceeded k consecutive times (305). If the threshold was exceeded for the $k^{th}$ consecutive time, then the process continues to the cost-effectiveness test of FIG. 5. If, at 303, a determination was made that the threshold of detection had not been exceeded then the threshold of detection is recomputed (309). The recomputation of the preferred embodiment includes determining if the total number of responses following the last rebase is less than s . If the number of responses is less than s then the threshold is set to m0. If the number of responses is not less than s then the threshold is set to the new mean. Processing then continues without rebasing (311) by returning to the block 111 of FIG. 1.

Figure 4:
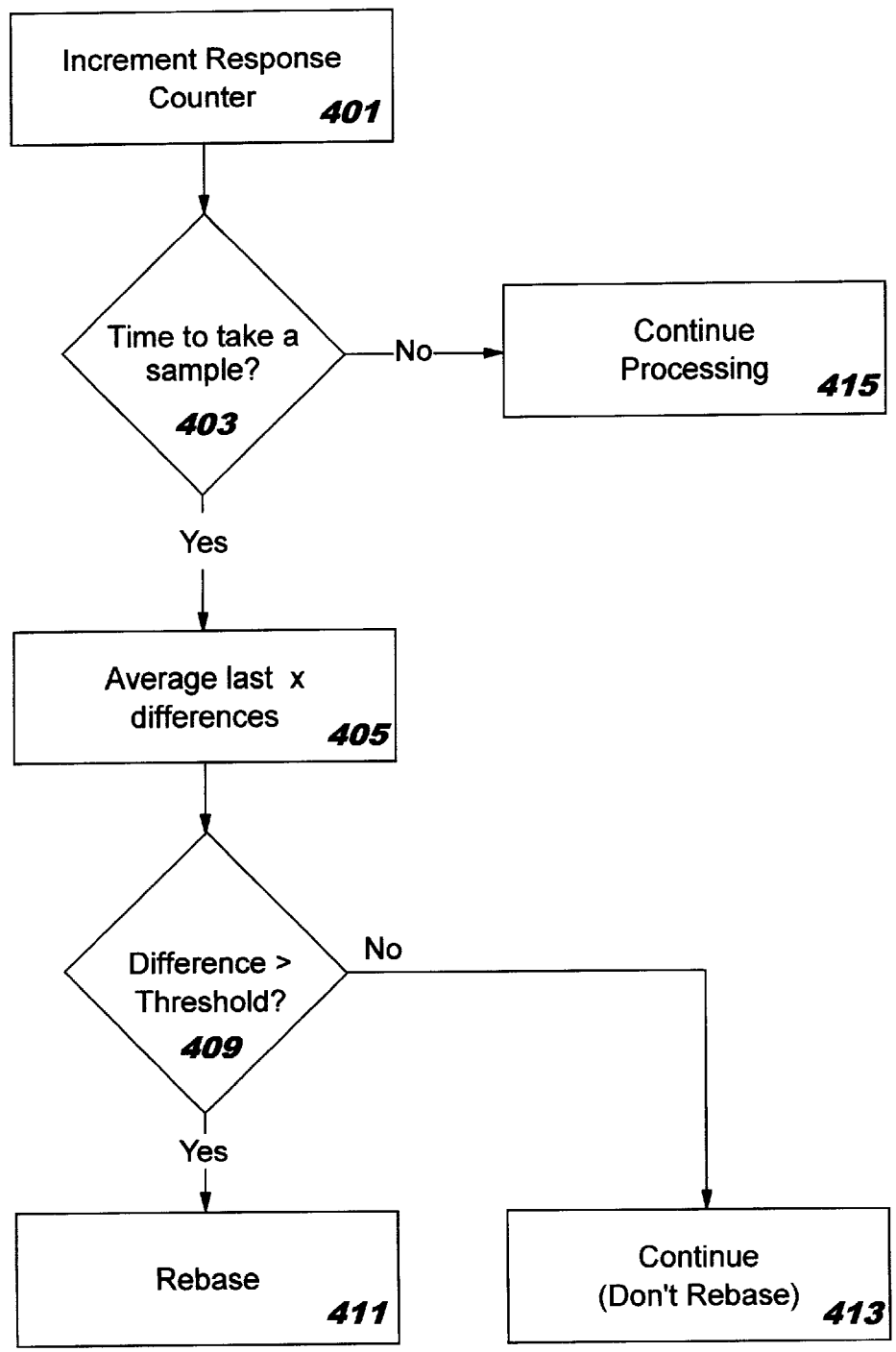
FIG. 4 is a flow chart of a possible testing methodology for the present invention.

FIG. 4 is a pictorial representation of a test for the long-term increase in difference size implemented in the preferred embodiment. First, the response counter is incremented to reflect the most recently received response (401). Next, a test is made to determine whether it is time to sample the data. In the preferred embodiment, this is accomplished by determining if the response counter is greater than or equal top (which is a predetermined value). If the response counter is not greater than or equal top then no determination can be made as to a 'long-term' change since there is not yet a large enough sample and control is returned to the difference computation and sending the difference to the server (415). At the present time the preferred embodiment has p equal to 18 but this is not meant as a limitation or restriction of the present invention. The counter can be set to any positive integer.

If, at block 403, the response counter is greater than or equal to p then an average of the last x differences is computed (405) where x is a sampling value that is customizable by the user. A test is then made to determine whether the average of the last x differences is greater than the historical base difference average plus a predetermined threshold (409). The historical base difference average is based on averages of x-sized samples of difference sizes taken immediately following rebasing. In the current implementation of the preferred embodiment, it is based only on the last sample taken. If the test in block 409 is true, a rebase is indicated (411); otherwise, processing continues as before (413).

FIG. 5 is a representation of the rebasing cost-effectiveness logic. First the cost of rebasing, N, is computed. In the preferred embodiment, the cost of rebasing is computed as the number of requests that must be served before rebasing would result in a lower net cost than not rebasing. The formula for N in the preferred embodiment is $M*d0/(d0-d\hat{\,})$, where M is the number of clients expected to request the URL before it is rebased again, d0 is the mean size of a recent sample of response differences, and d^ is an estimate of the expected mean difference size if the document were to be rebased. If N is less than the average number of requests served for this URL between rebasings, rebasing is judged to be cost-effective (507) and that indication is returned for further processing. If N is greater than or equal to the average number of requests served for this URL between rebasings, then rebasing is determined not to be cost effective (505) and that indication is returned.

What is claimed is:

1. In a computer network containing wireless communications connections, a method for optimizing transmission of information across a wireless link, comprising the steps of:

identifying an information base form as a template for transmission of information from a first computer to a second computer;

comparing information to be sent across said wireless link from said first computer to said second computer with said information base form, said comparing step calculating a difference between said information base form and said information to be sent;

performing a plurality of different rebasing tests to detect whether a rebase of said information base form is indicated;

determining whether said rebase is cost-effective when said rebase is indicated, wherein said rebase is cost-effective if said rebase results in a lower cost of sending said information across said wireless link than not rebasing;

sending said calculated difference from said first computer to said second computer;

updating said information base form with said information to be sent when said rebase is indicated and said rebase is cost-effective; and sending a rebasing indicator from said first computer to said second computer when said rebase is indicated and said rebase is cost-effective, along with said calculated difference.

2. The method as in claim 1, wherein said step of determining whether said rebase is cost-effective further comprises the steps of:

determining a cost of rebasing; and determining an average number of requests between rebases; and further comprising the step of concluding that said rebase is cost-effective only if the average number of requests between rebases exceeds the cost of rebasing.

3. A computer communication system for optimizing transmission of information from a first computer of a plurality of computers connected together with communications links to a second computer of said plurality, said transmission occurring across said communications links, said system comprising:

means for identifying a base form used as a template at said first computer;

means for calculating a difference between said information to be transmitted and said base form template;

means for calculating a size of said difference between said information to be transmitted and said base form template;

means for performing a plurality of different rebasing tests to detect whether a rebase of said base form template is indicated;

means for determining whether said rebase is cost-effective when said rebase is indicated, wherein said rebase is cost-effective if said rebase results in a lower cost of sending said information across said wireless link than not rebasing;

means for transmitting said calculated difference from said first computer to said second computer;

means for updating said base form template with said information to be transmitted when said rebase is indicated and said rebase is cost-effective; and means for transmitting a rebase indicator from said first computer to said second computer when said rebase is indicated and said rebase is cost-effective, along with said calculated difference.

4. The computer communication system as claimed in claim 3, wherein said means for determining whether said rebase is cost-effective further comprises:

means for programmatically determining a cost of updating said template; and means for programmatically determining an average number of requests between updates to said template; and further comprising means for concluding that said rebase is cost-effective if said average number of request between updates exceeds said cost of updating said template.

5. A program product residing on a machine readable medium, said program product comprising:

machine readable means for connecting together a plurality of computers with communications links, said plurality of computers having a first computer and a second computer;

programmable means for transmitting information from said first computer to said second computer across said communications links, said programmable means further comprising:

programmatic means for identifying a base form used as a template at said first computer;

programmatic means for calculating a difference between said information to be transmitted and said base form template;

programmatic means for calculating a size of said difference between said information to be transmitted and said base form template;

programmatic means for performing a plurality of different rebasing tests to detect whether a rebase of said base form template is indicated;

programmatic means for determining whether said rebase is cost-effective when said rebase is indicated, wherein said rebase is cost-effective if said rebase results in a lower cost of sending said information across said wireless link than not rebasing;

programmatic means for transmitting said calculated difference from said first computer to said second computer;

programmatic means for updating said base form template with said information to be transmitted when said rebase is indicated and said rebase is cost-effective; and programmatic means for transmitting a rebase indicator from said first computer to said second computer when said rebase is indicated and said rebase is cost-effective, along with said calculated difference.

6. The program product as claimed in claim 5, wherein said programmatic means for determining whether said rebase is cost-effective further comprises:

programmatic means for determining a cost of updating said template; and programmatic means for determining an average number of requests between updates to said template; and further comprising programmatic means for concluding that said rebase is cost-effective if said average number of requests between updates to said template exceeds said cost of updating said template.

7. The method as in claim 1, wherein said performing a plurality of different rebasing tests step further comprises the step of performing a sharp increase detection test.

8. The method as in claim 7, wherein said performing said sharp increase detection test step further comprises the steps of:
   computing a mean difference since a last rebase;
   comparing said computed mean difference to a detection threshold;
   recomputing said detection threshold when said computed mean difference is not greater than said detection threshold;
   determining whether said detection threshold has been exceeded a predetermined number of times when said computed mean difference is greater than said detection threshold; and
   concluding that said rebase is indicated when said determining whether said detection threshold has been exceeded step has a positive result.

9. The method as in claim 1, wherein said performing a plurality of different rebasing tests step further comprises the step of performing a gradual increase detection test.

10. The method as in claim 9, wherein said performing said gradual increase detection test step further comprises the steps of:
    incrementing a response counter;
    comparing said response counter to a sampling value to determine whether a sample should be taken; and
    taking said sample when said comparing step determines that said response counter is greater than said sampling value, further comprising the steps of:
       determining whether a current average of differences is greater than a historical difference of averages plus a predetermined threshold; and
       concluding that said rebase is indicated when said determining whether said current average is greater step has a positive result.

11. The system as in claim 3, wherein said means for performing a plurality of different rebasing tests further comprises means for performing a sharp increase detection test.

12. The system as in claim 11, wherein said means for performing said sharp increase detection test further comprises:
    means for computing a mean difference since a last rebase;
    means for comparing said computed mean difference to a detection threshold;
    means for recomputing said detection threshold when said computed mean difference is not greater than said detection threshold;
    means for determining whether said detection threshold has been exceeded a predetermined number of times when said computed mean difference is greater than said detection threshold; and
    means for concluding that said rebase is indicated when said means for determining whether said detection threshold has been exceeded has a positive result.

13. The system as in claim 3, wherein said means for performing a plurality of different rebasing tests further comprises means for performing a gradual increase detection test.

14. The system as in claim 13, wherein said means for performing said gradual increase detection test further comprises:
    means for incrementing a response counter;
    means for comparing said response counter to a sampling value to determine whether a sample should be taken; and
    means for taking said sample when said means for comparing determines that said response counter is greater than said sampling value, further comprising:
       means for determining whether a current average of differences is greater than a historical difference of averages plus a predetermined threshold; and
       means for concluding that said rebase is indicated when said means for determining whether said current average is greater has a positive result.

15. The program product as in claim 5, wherein said programmatic means for performing a plurality of different rebasing tests further comprises programmatic means for performing a sharp increase detection test.

16. The program product as in claim 15, wherein said programmatic means for performing said sharp increase detection test further comprises:
    programmatic means for computing a mean difference since a last rebase;
    programmatic means for comparing said computed mean difference to a detection threshold;
    programmatic means for recomputing said detection threshold when said computed mean difference is not greater than said detection threshold;
    programmatic means for determining whether said detection threshold has been exceeded a predetermined number of times when said computed mean difference is greater than said detection threshold; and
    programmatic means for concluding that said rebase is indicated when said programmatic means for determining whether said detection threshold has been exceeded has a positive result.

17. The program product as in claim 5, wherein said programmatic means for performing a plurality of different rebasing tests further comprises programmatic means for performing a gradual increase detection test.

18. The program product as in claim 17, wherein said programmatic means for performing said gradual increase detection test further comprises:
    programmatic means for incrementing a response counter;
    programmatic means for comparing said response counter to a sampling value to determine whether a sample should be taken; and
    programmatic means for taking said sample when said programmatic means for comparing determines that said response counter is greater than said sampling value, further comprising:
       programmatic means for determining whether a current average of differences is greater than a historical difference of averages plus a predetermined threshold; and
       programmatic means for concluding that said rebase is indicated when said programmatic means for determining whether said current average is greater has a positive result.

19. The method as in claim 2, wherein said step of determining said cost of rebasing further comprises the steps of:

multiplying a number of clients expected to request said information to be transmitted before a next rebasing of said base form by a mean size of a recent sample of response differences, resulting in a first product;

subtracting an estimate of an expected mean difference size if said next rebasing occurred from said mean size of said recent sample, resulting in a first difference; and dividing said first product by said first difference, resulting in said cost of rebasing.

20. The computer communication system as in claim 4, wherein said first means for programmatically determining said cost of updating said template further comprises:

means for multiplying a number of clients expected to request said information to be transmitted before a next rebasing of said base form by a mean size of a recent sample of response differences, resulting in a first product;

means for subtracting an estimate of an expected mean difference size if said next rebasing occurred from said mean size of said recent sample, resulting in a first difference; and means for dividing said first product by said first difference, resulting in said cost of updating said template.

21. The program product as in claim 6, wherein said first programmatic means for determining said cost of updating said template further comprises:

programmatic means for multiplying a number of clients expected to request said information to be transmitted before a next rebasing of said base form by a mean size of a recent sample of response differences, resulting in a first product;

programmatic means for subtracting an estimate of an expected mean difference size if said next rebasing occurred from said mean size of said recent sample, resulting in a first difference; and programmatic means for dividing said first product by said first difference, resulting in said cost of updating said template.

* * * * *